United States Patent [19]
McCarty

[11] Patent Number: 4,741,155
[45] Date of Patent: May 3, 1988

[54] LUBRICATION METHOD AND APPARATUS

[75] Inventor: Robert S. McCarty, Phoenix, Ariz.

[73] Assignee: Allied-Signal Inc., Morris Township, Morris County, N.J.

[21] Appl. No.: 57,393

[22] Filed: Jun. 3, 1987

Related U.S. Application Data

[62] Division of Ser. No. 806,587, Dec. 9, 1985, Pat. No. 4,697,414.

[51] Int. Cl.$^4$ .............................. F02C 7/06; B67B 7/24
[52] U.S. Cl. .................................. 60/39.02; 60/39.08; 222/82; 184/6.11; 184/39
[58] Field of Search ................. 184/6.4, 6.11, 39; 60/39.08, 39.02; 222/91, 82

[56] References Cited

U.S. PATENT DOCUMENTS

| | | |
|---|---|---|
| 3,132,974 | 5/1964 | Gold ..................................... 222/82 |
| 3,231,317 | 1/1966 | Dudar ................................. 184/6.4 |
| 3,637,048 | 1/1972 | Mount . |
| 4,002,224 | 1/1977 | Easter . |
| 4,105,093 | 8/1978 | Dickinson . |
| 4,153,141 | 5/1979 | Methlie . |
| 4,157,744 | 6/1979 | Capriotti . |
| 4,284,174 | 8/1981 | Salvana et al. . |
| 4,359,140 | 11/1982 | Shreve ................................. 184/6.4 |
| 4,373,421 | 2/1983 | Camboulives et al. ............. 184/6.4 |
| 4,385,714 | 5/1983 | Szabo et al. ........................... 222/82 |
| 4,390,082 | 6/1983 | Swearingen ......................... 184/6.4 |

FOREIGN PATENT DOCUMENTS

| | | |
|---|---|---|
| 951790 | 10/1956 | Fed. Rep. of Germany ........ 222/82 |
| 731170 | 5/1980 | U.S.S.R. .............................. 60/39.08 |

Primary Examiner—Carlton R. Croyle
Assistant Examiner—Donald E. Stout
Attorney, Agent, or Firm—Terry L. Miller; James W. McFarland

[57] ABSTRACT

A lubrication system for expendable turbine engines, or for emergency use with durable engines, comprises a housing receiving a collapsible bladder filled with lubricant, and means for penetrating the bladder and communicating the lubricant to a receiver upon the occurrence of a predetermined event.

11 Claims, 2 Drawing Sheets

LUBRICATION METHOD AND APPARATUS

This is a division of application Ser. No. 806,587, filed Dec. 9, 1985, now U.S. Pat. No. 4,697,414.

BACKGROUND OF THE INVENTION

The field of the present invention is method and apparatus for supplying liquid lubricant from a reservoir thereof to a place of utilization. More particularly, the present invention relates to method and apparatus for supplying liquid lubricant to the bearings of a combustion turbine engine.

Present Federal Aviation Administration (FAA) regulations require that a combustion turbine engine, whether of turboshaft, turboprop, turbofan or turbojet configuration, be able to continue engine operation for a period of no less than thirty seconds after the loss of oil flow from the main oil supply system to the engine bearings without suffering engine damage. This thirty second grace period provides a time during which the pilot of the aircraft may decide, for example, whether a take-off may be aborted following the loss of the main engine oil supply system. In the event that the take-off cannot be aborted, the thirty seconds of engine operation without damage provides at least a portion of the operating time which is required to complete the take-off and arrange for a safe landing at the air field. With present engine designs this grace period of thirty seconds is provided by overdesign of the engine bearings so that they may operate without their normal lubricant coolant flow, utilizing whatever lubrication may remain in the bearing after the cessation of this lubricating and cooling flow to sustain bearing operation without damage.

Conventional proposals have been made to supply the bearings of a turbine engine with emergency lubricating oil from a main oil tank which is kept under pressure during normal engine operation and, in the event of failure of the main oil pump, flow is allowed via an alternative flow path from the oil tank under internal pressure to the bearings through a check valve. This conventional proposal is undesirably complex and is subject to substantially the same risk of damage as is the main oil supply system because it uses the main oil supply tank.

Alternative conventional emergency lubrication systems for turbine engines have variously proposed the use of aspirating nozzles or an aerosol generating apparatus to carry emergency lubricating oil to the engine bearings along with a cooling air stream. However, these proposals also suffer from undue complexity and risk of damage in common with the main oil supply system. Yet another alternative proposal has been to provide an accumulator in an oil supply line to the engine bearings. The accumulator receives a collapsible bladder normally pressurized internally to a level lower than the oil supply from the main lubrication system. Upon the failure of the main lubrication system, the accumulator in conjunction with a check valve preventing backflow to the main lubrication system supplies oil to the bearings as the bladder is expanded by its internal pressure.

Each of these conventional emergency lubrication supply systems is recognized as suffering from one or more of several deficiencies. These emergency lubrication systems are exceedingly complex in many cases, they are therefore inordinately expensive, and are also subject to failure in common with the main lubrication system or because of modes of failure related uniquely to the emergency lubrication system itself. It is recognized, therefore, as desirable that turbine engines be provided with an emergency lubrication system which is simple in structure, inexpensive, and not subject to many of the causes of failure which may befall the main engine lubrication system.

Yet another area of recognized problem in the turbine engine field is that of supplying bearing lubrication to expendable engines such as those designed for short term operations of weapon-carrying vehicles or target drones. As will be appreciated, because these engines are expendable, their price and the cost of associated components and systems must be kept as low as possible. Also, these lubrication supply systems must be extraordinarily reliable because in many cases the target drone or weapons-carrying vehicle will be expected to endure storage for a number of years prior to its operation, after which its operation without preparatory field service is expected.

SUMMARY OF THE INVENTION

Accordingly, the present invention provides an emergency or expendable lubrication system for turbine engines wherein a housing is provided which preferably is mounted to a location on the engine which provides a heat transfer to the housing during the engine's operation. A compressible bladder is received within the housing and substantially fills the volume there within. The bladder is hermetically sealed and contains a supply of lubricating fluid for the engine. A portion of the bladder and the housing are cooperatively configured to penetrate the bladder upon the interior of the housing being pressurized and to communicate the liquid lubricant contained within the bladder to the bearings of the engine.

More particularly, the housing defines a circular bore wherein is sealingly and captively received a shape retaining portion of the bladder which also defines a penetrable diaphragm. Within the bore a penetrating member or lance confronts the diaphragm, and the lance and diaphragm are resiliently biased away from one another. However, when the interior of the housing is pressurized, the shape retaining portion of the bladder acts as a piston to compress the resilient biasing means and impale the diaphragm upon the penetrating lance. A passage within the lance provides communication of the liquid lubricant within the bladder to the engine bearings upon penetration of the diaphragm by the lance.

An advantage of the invention is that the structure of the emergency or expendable lubrication system is very simple and reliable as well as being low in cost. This inventive apparatus can well endure storage for indeterminant periods of time without deterioration or a loss of its ability to function. When applied to a commercial or general aviation engine, the emergency lubrication system may be provided with a lubricant having a higher viscosity then that normally used in the engine bearings. However, because the emergency lubrication system is disposed upon a portion of the engine casing which transmits engine operating heat to the lubricant contained within the collapsible bladder, the normally high viscosity lubricant is warmed and decreased in viscosity to an extent which allows its advantageous use in the engine bearings. Further, because the optionally higher viscosity lubricant used within the emergency lubrication system better provides a lubricant film for the engine bearings, it is believed possible with this invention to provide a safe period of operation without bearing damage well is excess of that required by current FAA regulations. In fact, with this invention in the event that a commercial or general aviation engine suffers loss of its main lubrication system, it is believed possible upon the actuation of the emergency lubrication system herein described to continue normal engine operation for a designed period of fifteen minutes, to as much as twenty minutes without suffering any bearing damage. The much increased grace period provided by this invention provides for not only a decision making time but also a time during which a take-off can be completed, if desired, and the aircraft circled back to land once again on its home runway.

The following references in United States patents are submitted as potentially relevant to the subject invention because they were located by a pre-examination patentability search conducted on behalf of the applicant in the files of the United States Patent and Trademark Office.

| U.S. Pat. No. | INVENTOR(S) |
| --- | --- |
| 3,637,048 | G. L. Mount |
| 4,002,224 | M. J. Easter |
| 4,105,093 | J. D. Dickinson |
| 4,153,141 | J. E. Methlie |
| 4,157,744 | L. J. Capriotti |
| 4,284,174 | F. Salvana et al |
| 4,373,421 | A. Camboulives et al |
| 4,390,082 | J. S. Swearingen |

BRIEF DESCRIPTION OF THE DRAWING FIGURES

FIG. 1 schematically depicts a combustion turbine engine embodying the invention;

DETAILED DESCRIPTION OF THE PREFERRED EMBODIMENT OF THE INVENTION

Figure 1:
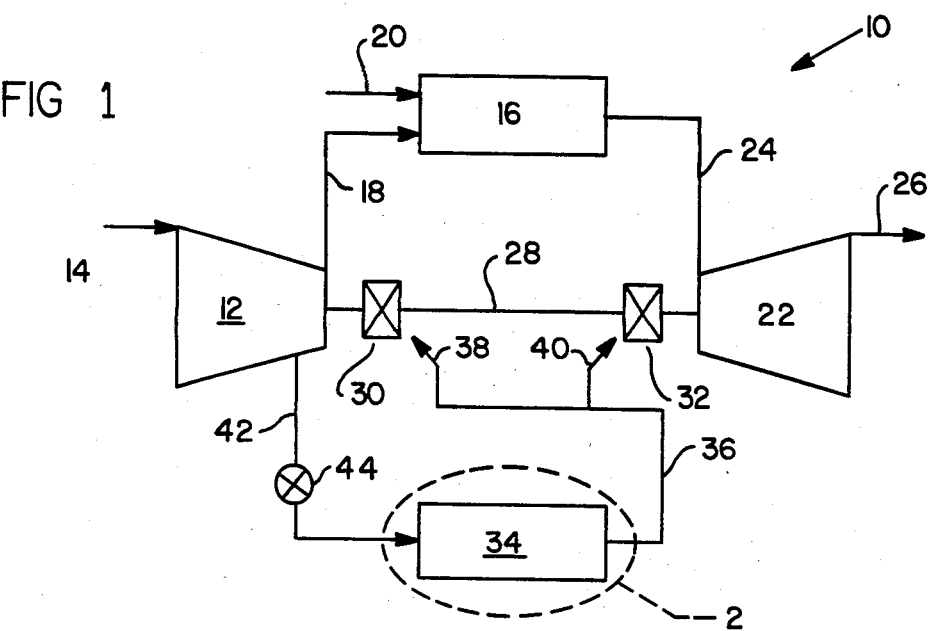

FIG. 1 schematically depicts a combustion turbine engine 10 including a rotatable compressor 12 which inducts ambient air as is indicated by arrow 14. Compressor 12 delivers the compressed ambient air pressurized to a combustor 16 as is depicted by arrow 18. Within combustor 16 the pressurized ambient air is mixed with fuel as is depicted by arrow 20 to maintain combustion producing a supply of high temperature, high energy combustion products. The combustion products are supplied to a rotatable compressor 22 as is depicted by arrow 24 for expansion to produce shaft power. After expansion within the turbine section of the engine, the combustion products are exhausted to ambient as is depicted by arrow 26.

Each of the compressor 12 and turbine 22 are drivingly connected to opposite ends of a rotatable shaft 28 which is journaled within a housing (not shown) of the turbine engine 10 by spaced apart bearings 30 and 32. In order to provide liquid lubricant, which also acts as a coolant, to the bearings 30 and 32, a reservoir 34 is provided with a conduit 36 extending therefrom to spray nozzles directed at the bearings 30 and 32, as is depicted by arrows 38 and 40. A conduit 42 including a control valve 44 is provided to receive pressurized air from the compressor 12 and to supply this air to the reservoir 34.

Figure 2:
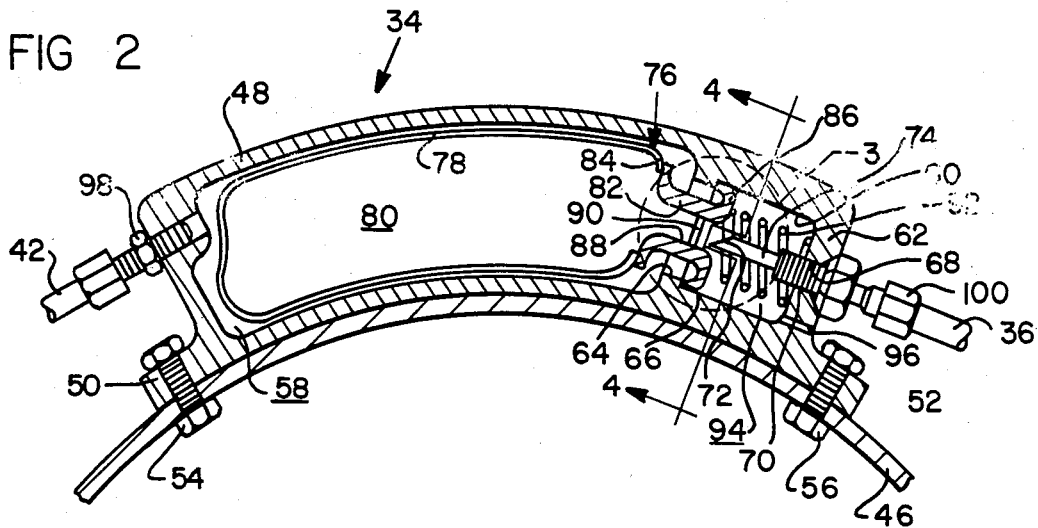
FIG. 2 depicts a cross-sectional fragmentary view of a preferred embodiment of the invention in a first operative position of cooperating parts.

Turning now to FIG. 2, it will be seen that the reservoir 34 is arcuate in configuration to generally conform to a circumferentially extending arcuate wall 46 of the combustion turbine engine 10. The reservoir includes a housing 48 which defines a pair of circumferentially oppositely extending bosses 50 and 52 receiving in bores thereof a pair of fasteners 54 and 56 securing the housing 48 to the wall 46.

The housing 48 also defines a chamber 58 therewithin which extends circumferentially, as depicted, as well as extending axially. That is, the chamber 58 extends perpendicularly to the plane of FIG. 2. The housing 48 also defines a stepped circular bore 60 opening at its left end to the chamber 58 and being substantially closed at its right end by a wall portion 62. A reduced diameter portion 64 of the bore 60 cooperates with the remainder thereof to define a rightwardly directed step or shoulder 66 which confronts the wall portion 62. The bore 60 at a reduced diameter portion 68 thereof threadably receives a lance assembly 70 which is disposed centrally of the bore 60 and terminates at a sharp, penetrating end 72 disposed rightwardly of the opening of bore 60 to chamber 58. Intermediate of the penetrating end 72 and the wall 62 closing the rightward end of bore 60, the lance assembly 70 defines a shank 74 of circular cross-section.

Figure 5:
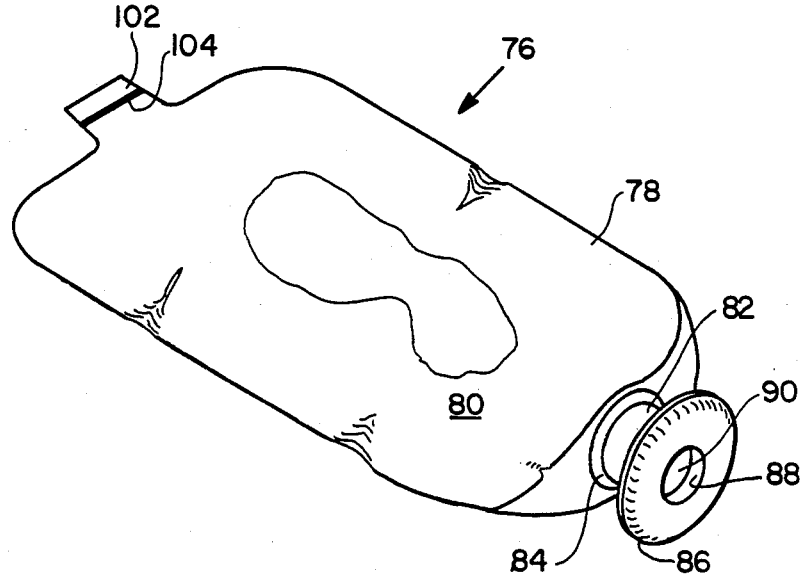
FIG. 5 depicts a perspective view of a collapsible bladder component part of the invention.

Disposed within the chamber 58 and bore 60 is a bladder structure 76 which is also depicted perspectively by FIG. 5. The bladder assembly 76 comprises a collapsible body portion 78 which receives a quantity of liquid lubricant 80. The body 78 of bladder 76 is fabricated of a flexible lubricant-impermeable sheet material which is able to withstand the operating environment of a combustion turbine engine. For example, the applicant has determined that a fluorosilicon polymer meets the temperature requirements of the subject environment and is compatible with the lubricants ordinarily used in combustion turbine engines. The bladder 76 also includes a neck portion 82 projecting outwardly away from the body 78 of the bladder 76. The neck portion comprises at one end thereof a radially outwardly extending flange part 84 to which is secured the body portion 78 of bladder 76. Neck portion 82 also includes at the opposite end thereof, that is, remote from body portion 78, a radially outwardly extending and angularly disposed lip 86 which is continuous circumferentially and at its radially outer edge extends axially toward the body portion 78. Neck portion 82 also defines an axially extending through bore 88. Disposed in and closing the through bore 88 is a transverse, penetrable diaphragm 90. The diaphragm 90 may be integral with the neck portion 82, or it may be adhesively or heat sealed, for example, within the bore 88.

Figure 4:
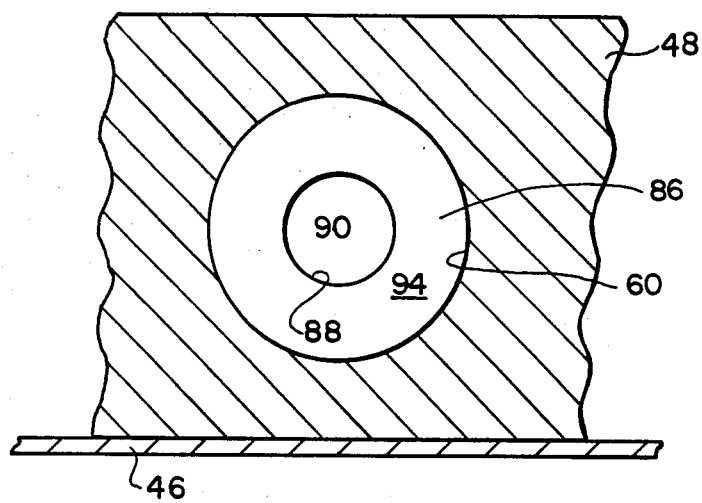
FIG. 4 depicts a fragmentary cross-sectional view of a housing of the invention defining a bore wherein is sealingly and moveably received a shape-retaining neck portion of the collapsible bladder which is more fully depicted by FIG. 5.

Considering now FIGS. 2 and 4, it will be seen that the neck portion 82 of bladder 76 is received within the bore 60 rightwardly of the reduced diameter portion 64 thereof so that the radially outer periphery of lip 86 engages the shoulder 66. The neck portion 82 is resiliently biased into engagement with the shoulder 66 by a coil compression spring 92 received within the bore 60 between the neck portion 82 and the end wall 62 in slight preload. Thus, it will be appreciated that the penetrable diaphragm 90 is disposed in confronting relationship with but slightly spaced away from the penetrating tip 72 of the lance assembly 70. FIG. 4 depicts the sealing relationship of the neck portion 82 and the lip 86 thereof within the bore 60. Thus, it will be observed that the neck portion of bladder 76 cooperates with the housing 48 to define a chamber 94 which is sealingly separated from chamber 58. The housing 48 also defines a vent passage 96 opening outwardly of the chamber 94 to ambient.

In order to complete this description of the structure of the preferred embodiment of the invention, it must be pointed out that the housing 48 also receives a fitting 98 to which is attached the air pressure conduit 42 leading form compressor 12 via the valve 48. Also attached to the housing 48, and more particularly to the lance assembly 70 thereof, is a fitting 100 to which is attached the conduit 36 extending to the spray nozzles 38 and 40 within the engine 10. It will be appreciated that the lance assembly 70 defines a through bore (not illustrated) opening at one end of the lance assembly in the penetrating tip 72 and opening at the other end within the fitting 100 for communication of lubricant through the lance assembly and to the conduit 36.

Figure 3:
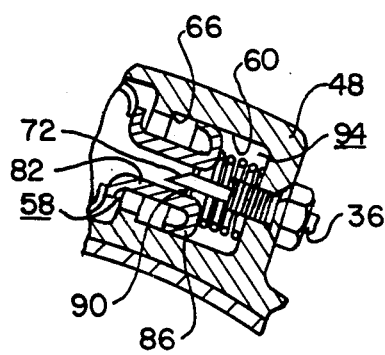
FIG. 3 depicts an encircled portion of FIG. 2 with cooperating parts of the invention in alternative operative positions.

Having observed the structure of the preferred embodiment of the invention, attention may now be given to its method of operation. In the event a commercial or general aviation engine loses operation of its normal oil supply system, the emergency lubrication system herein depicted and described may be brought into operation by opening of the normally closed valve 44 during operation of the engine. It will be appreciated that pressurized air from compressor 12 flows via conduit 42 and open valve 44 through the fitting 98 to chamber 58 within housing 48. When the pressure within chamber 58 reaches a sufficient and predetermined level, the force acting upon the piston-like neck portion 82 within bore 60 is sufficient to overcome the preload of spring 92. Consequently, the neck portion 82 moves rightwardly within the bore 60 to impale the penetrable diaphragm 90 upon the penetrating end 72 and shank 74 of the lance assembly 70. Upon penetrating the diaphragm 90, the lance assembly 70 at its shank 74 sealingly cooperates therewith to prevent leakage of lubricant 80 there past and into chamber 92 (viewing FIG. 3). Consequently, the pressure applied to the exterior of bladder 76 by the air pressure supplied to chamber 58 causes the lubricant 80 to flow through the lance assembly 70, through fitting 100, and via conduit 36 to the spray nozzles 38 and 40, from which the lubricant is supplied to the engine bearings 30 and 32. In the case of application of the present invention to an expendable engine, it will be understood that the valve 44 may be eliminated so that initiation of engine operations and the attendant pressurized air supplied by the compressor 12 automatically results in the beginning of lubricant supply to the engine bearings in the manner described immediately above.

Further, viewing FIG. 5 it will be seen that the lip 86 of neck portion 82 on bladder 76 extends in its free and unrestrained condition substantially radially outwardly, although it is curved slightly toward the bladder body 78. Thus, the lip 86 because of its shape-retaining character must be forced into the bore 60 past the reduced diameter portion 64 thereof during assembly of the component parts of the reservoir 10. Once within the bore 60, the lip 86 sealingly engages the bore 60 to separate chambers 58 and 94. Also, the lip 86 engages the step 66 under bias provided by spring 92 to captively retain the neck portion within bore 60. Finally, it will be noted that bladder body 78 may also include a tail portion 102 (viewing FIG. 5) whereat the walls of the bladder are closely adjacent during manufacture but prior to filling of the bladder with lubricant 80. The tail portion 102 may thus provide an opening for filling of bladder 76 with lubricant, after which the bladder is sealed adhesively or by heat sealing, as depicted at 104.

While the present invention has been depicted and described with reference to a particularly preferred embodiment thereof, such reference is not intended to imply a limitation upon the invention, and no such limitation is to be inferred. The invention is intended to be limited only by the scope and spirit of the appended claims which also provide a definition of the invention.

I claim:

1. In a combustion turbine engine comprising a bearing member journaling a rotatable component, and compressor means providing pressurized air, the method of providing liquid lubricant to said bearing member comprising the steps of:
   providing said liquid lubricant sealed within a collapsible and penetrable bladder member;
   enclosing said bladder member and lubricant within a substantially closed housing sealingly cooperating with said bladder member to define a pair of chambers;
   arranging a penetrating lance member in one of said pair of chambers in confronting relationship with said bladder member;
   providing communication of said pressurized air with the other of said pair of chambers to force said bladder member into impaled sealing relationship with said lance member;
   communicating said lubricant to said bearing member via said lance member; and
   utilizing said pressurized air within said other chamber to collapse said bladder member, simultaneously flowing said lubricant to said bearing member.

2. The method of claim 1 further including the steps of:
   configuring said housing to define said one chamber within a circular bore;
   providing said bladder member with a shape-retaining neck portion of circular section generally matching said bore;
   movably and sealingly disposing said neck portion within said bore to separate said one chamber from said other chamber; and
   providing said neck portion with a penetrable diaphragm sealingly cooperable with said lance member and in confronting relation therewith.

3. The method of claim 2 further including the steps of:
   providing said neck portion with a radially outwardly and axially extending lip terminating in a circumferentially continuous sealing edge cooperable with said bore and disposed toward the remainder of said bladder member;

configuring said bore with a reduced diameter portion cooperating with the remainder of said bore to define a shoulder thereon disposed toward said one chamber;

cooperatively engaging said lip member with said shoulder in a first relative position to captively retain said neck portion within said bore with said diaphragm in confrontation with said lance member.

4. The method of claim 1 further including the steps of: arranging said housing in heat transfer relation with a casing of said combustion turbine engine which is heated by operation thereof; transferring operating heat from said engine casing to said housing; and utilizing said transferred heat to warm said liquid lubricant and decrease the viscosity thereof.

5. The method of claim 1 further including the step of interposing selectably operable valve means in fluid flow series between said compressor means source of pressurized air and said other chamber.

6. The method of claim 1 including the step of configuring said housing in generally conformal relationship with said engine casing.

7. Apparatus comprising:
a housing member defining a substantially closed cavity therewithin, and a bore opening at one end to said cavity, said housing member defining a wall portion substantially closing the other end of said bore;

a closed collapsible bladder disposed within said housing chamber and holding a determined quantity of liquid, said bladder including a shape-retaining neck portion received within said bore, said neck portion including means for sealingly and movably cooperating with said bore to define a variable-volume chamber therewithin adjacent said wall portion, said sealing means comprising said neck portion integrally defining a radially outwardly and axially extending lip sealingly and movably engaging said bore, said neck portion carrying a penetrable diaphragm member;

penetrating means disposed within said variable-volume chamber in confronting relationship with said diaphragm for penetrating the latter and communicating said liquid to a receiver therefor.

8. The invention of claim 7 wherein said bore is stepped to provide a shoulder spaced from and confronting said wall portion, said lip engaging said shoulder in a first relative position to captively retain said neck portion within said bore.

9. The invention of claim 8 further including yieldable resilient means for urging said housing and neck portion to said first relative position.

10. The invention of claim 9 further including means to pressurize said housing cavity whereby said neck portion is forced into said bore to a second relative position to impale said diaphragm upon said lance and communicate said liquid to said receiver.

11. The invention of claim 8 wherein said penetrating means comprises a tubular lance member including a shank extending axially and centrally of said bore to terminate in a sharp tip confronting said diaphragm.

* * * * *